United States Patent [19]
Park

[11] Patent Number: 6,064,251
[45] Date of Patent: *May 16, 2000

[54] SYSTEM AND METHOD FOR A LOW VOLTAGE CHARGE PUMP WITH LARGE OUTPUT VOLTAGE RANGE

[75] Inventor: Eungjoon Park, Fremont, Calif.

[73] Assignee: Integrated Silicon Solution, Inc., Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/920,613

[22] Filed: Aug. 27, 1997

[51] Int. Cl.$^7$ .................................................. H03K 3/00
[52] U.S. Cl. ........................................ 327/536; 363/60
[58] Field of Search ................................. 327/534, 535, 327/536, 537, 589; 363/60

[56] References Cited

U.S. PATENT DOCUMENTS

| | | | |
|---|---|---|---|
| 5,140,182 | 8/1992 | Ichimura | 307/296.1 |
| 5,191,232 | 3/1993 | Wang | 307/264 |
| 5,499,183 | 3/1996 | Kobatake | 363/60 |
| 5,524,266 | 6/1996 | Tedrow et al. | 395/800 |
| 5,589,793 | 12/1996 | Kassapian | 327/536 |
| 5,818,289 | 10/1998 | Chevallier et al. | 327/536 |
| 5,821,805 | 10/1998 | Jinbo | 327/537 |

*Primary Examiner*—Jung Ho Kim
*Attorney, Agent, or Firm*—Pennie & Edmonds LLP

[57] ABSTRACT

A low voltage charge pump system with a large output voltage range is described. The charge pump system comprises eight charge pump stages, an output stage, and a four phase clock generator. The clock generator generates two sets of four phase shifted signals. The first set of four clock signals are coupled to the first four charge pump stages and have a logic high level of VCC. The second set of clock signals are coupled to the second four charge pump stages and have a logic high level of 2 VCC. Due to the body effect, the negative voltages at the charge pump output stages increases the threshold voltage of a pass transistor which couples the input and output in each charge pump. The larger high voltage level of the second set of clock signals enables the signals to overcome the body effect increased threshold voltages of the pass transistors. The pass transistors are then used to couple negative charge to the next charge pump stage, and positive charge to the preceding charge pump stage. The present invention charge pump system can thereby provide a large negative voltage output using a low power supply voltage. In the charge pump stages that receive the higher clock levels and in the output stage, the well of capacitor configured PMOS transistors that are coupled to the stage clock terminals is coupled to the source and drain of the transistors. Coupling the source, drain and well together prevents the 2 VCC voltage high level clock signals from forward biasing the p-n junction formed by the source and drain with the well. The charge pump stages and the output stage also include a p-n junction diode coupled from the output of the stage to ground.

18 Claims, 10 Drawing Sheets

SYSTEM AND METHOD FOR A LOW VOLTAGE CHARGE PUMP WITH LARGE OUTPUT VOLTAGE RANGE

The present invention relates generally to semiconductor devices, and more particularly to a charge pump system.

BACKGROUND OF THE INVENTION

Charge pumps are commonly used in flash and other types of solid state memory devices to provide voltages outside of the range of ground to the power supply voltage. In flash memory devices charge pumps are used to generate large negative voltages, such as −10 V, to erase memory cells.

A conventional eight stage charge pump using a four phase clock is illustrated in FIG. 1. The conventional charge pump system is comprised of eight charge pump stages 110–117, an output circuit 108, and a four phase clock generator 109. The four clock signals generated by clock 109 are labeled ($\Phi$1, $\Phi$1A, $\Phi$2 and $\Phi$2A. The eight charge pumps are connected in series so that the output of each charge pump provides a larger magnitude output voltage than the previous charge pump. The charge pump system of FIG. 1 is a negative charge pump system. Each charge pump stage 110–117 is comprised of a conventional charge pump circuit illustrated in FIG. 2. A circuit diagram of a conventional output stage 108 is illustrated in FIG. 3.

The charge pump system of FIG. 1 transfers negative charge from one charge pump stage to the next charge pump stage, and ultimately to NOUT 132. The system also transfers positive charge back through preceding charge pump stages to ground. The FIG. 2 charge pump circuit includes clock terminals OCK 220 and GCK 222, capacitor configured PMOS transistors P204 and P205 coupled to the clock terminals, PMOS pass transistor P201 coupled to IN 226 and OUT 224, and diode configured pull-down PMOS transistor P206. Referring to FIG. 2, when the clock signal coupled to OCK 220 goes high positive charge is coupled through the large capacitor formed by capacitor configured PMOS transistor P205 to node 224. Then the clock signal coupled to GCK 222 switches low and PMOS pass transistor P201 turns on. Positive charge is thereby coupled through transistor P201 and IN 226 to the preceding charge pump stage.

When the GCK 222 clock signal goes high, positive charge is coupled through the small capacitor formed by capacitor configured PMOS transistor P204. This positive charge increases the voltage of node 210 and turns off PMOS pass transistor P201. The OCK 220 clock signal then goes low which couples negative charge to node OUT 224. With transistor P201 off this negative charge is coupled to the next charge pump stage through OUT 224. This process of transferring positive charge to the preceding stage, and negative charge to the next stage is repeated at each charge pump stage. After a number of clock cycles, a negative output voltage is provided at NOUT 132.

The size of the output voltage that can be provided by conventional charge pump systems is limited by the increase in the threshold voltage of pass transistor P201. The threshold voltage $V_T$ for PMOS transistors increases with the bulk (substrate) to source voltage according to the equation $V_T = V_{TO} - \gamma (\sqrt{\Phi + V_{BS}} - \sqrt{\Phi})$, where $V_{BS}$ is the bulk to source voltage, $V_{TO}$ is threshold voltage for $V_{BS}=0$, $\gamma$ is the bulk threshold parameter and $\Phi$ is the strong inversion surface potential. As the negative output voltage at each stage is increased the bulk to source voltage increases. As a result when the voltage at OUT 224 reaches a sufficiently large negative value, the decrease in the voltage at the gate of pass transistor P201, caused by a falling edge of the GCK 222 clock signal, becomes inadequate to turn on pass transistor P201. With pass transistor P201 off, the charge pump system is not able to use the preceding charge pump stages to drive the output current.

One technique for reducing the body effect is to reduce the voltage of the well coupled to the substrate terminal of pass transistor P201. Reducing the well voltage increases the magnitude of the output voltage that a charge pump system can provide. However, the body effect remains a problematic limiting factor. The constraints imposed by the body effect are particularly significant with low power supply devices.

Thus a low voltage charge pump system with a large output voltage range that overcomes the above problems of the prior art would be highly desirable.

SUMMARY OF THE INVENTION

The present invention provides a low voltage charge pump system with a large output voltage range. In one embodiment, the charge pump system is comprised of eight negative charge pump stages, a four phase clock generator and an output stage. The charge pump stages are coupled in series. Each charge pump stage has two clock terminals that receive two phase shifted clock signals. The charge pump stages are configured so that adjacent charge pump stages receive different clock signals. In each charge pump a first clock signal is coupled through a capacitor configured PMOS transistor to the charge pump output, and a second clock signal is coupled through a capacitor configured PMOS transistor to the gate of a PMOS pass transistor whose input is coupled to the charge pump input and whose output is coupled to the charge pump output.

A rising edge of the first clock signal couples positive charge to the charge pump output. The four phase clock generator is defined so that shortly thereafter the second clock signal switches low which turns on the pass transistor thereby coupling the positive charge to the preceding charge pump stage. The four phase clock is further defined so that at this time the second clock signal at the next charge pump stage is high so that the pass transistor coupling the input to the output is off. As a result, the positive charge is blocked from passing through this next charge pump stage.

A falling edge of the first clock signal couples negative charge to the charge pump output. At this time, the second clock signal at that charge pump stage is high and therefore the pass transistor coupling the charge pump input and output is off. This prevents the negative charge from being coupled to the preceding charge pump. Also, the second clock signal at the next charge pump stage switches to low shortly thereafter so that the pass transistor that couples the next charge pump stage input and output turns on. As a result, the negative charge is coupled through to the next charge pump stage. This process is then repeated to provide a large negative output voltage.

The clock generator generates two sets of four phase shifted signals. In one embodiment, the first set of four clock signals are coupled to the first four charge pump stages and have a logic high level of VCC. The second set of clock signals are coupled to the second four charge pump stages and have a logic high level of 2 VCC.

The negative voltages at the charge pump output stages increases the threshold voltage of the pass transistor due to the body effect. The larger high voltage level of the second set of clock signals enables the signals to overcome the increased pass transistor threshold voltage, and turn the transistor on so as to couple negative charge to the output.

The present invention charge pump system can thereby provide a large negative voltage output using a low power supply voltage.

In the charge pump stages that receive the higher clock levels and in the output stage, the well of the capacitor configured PMOS transistors that are coupled to the two clock terminals is coupled to the source and drain of the transistors. Coupling the source, drain and well together prevents the 2 VCC voltage high level clock signals from forward biasing the p-n junction formed by the source and drain with the well. The charge pump stages and the output stage also include a p-n junction diode coupled from the output of the stage to ground. The diode keeps the output voltage from rising above the diode turn-on voltage.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
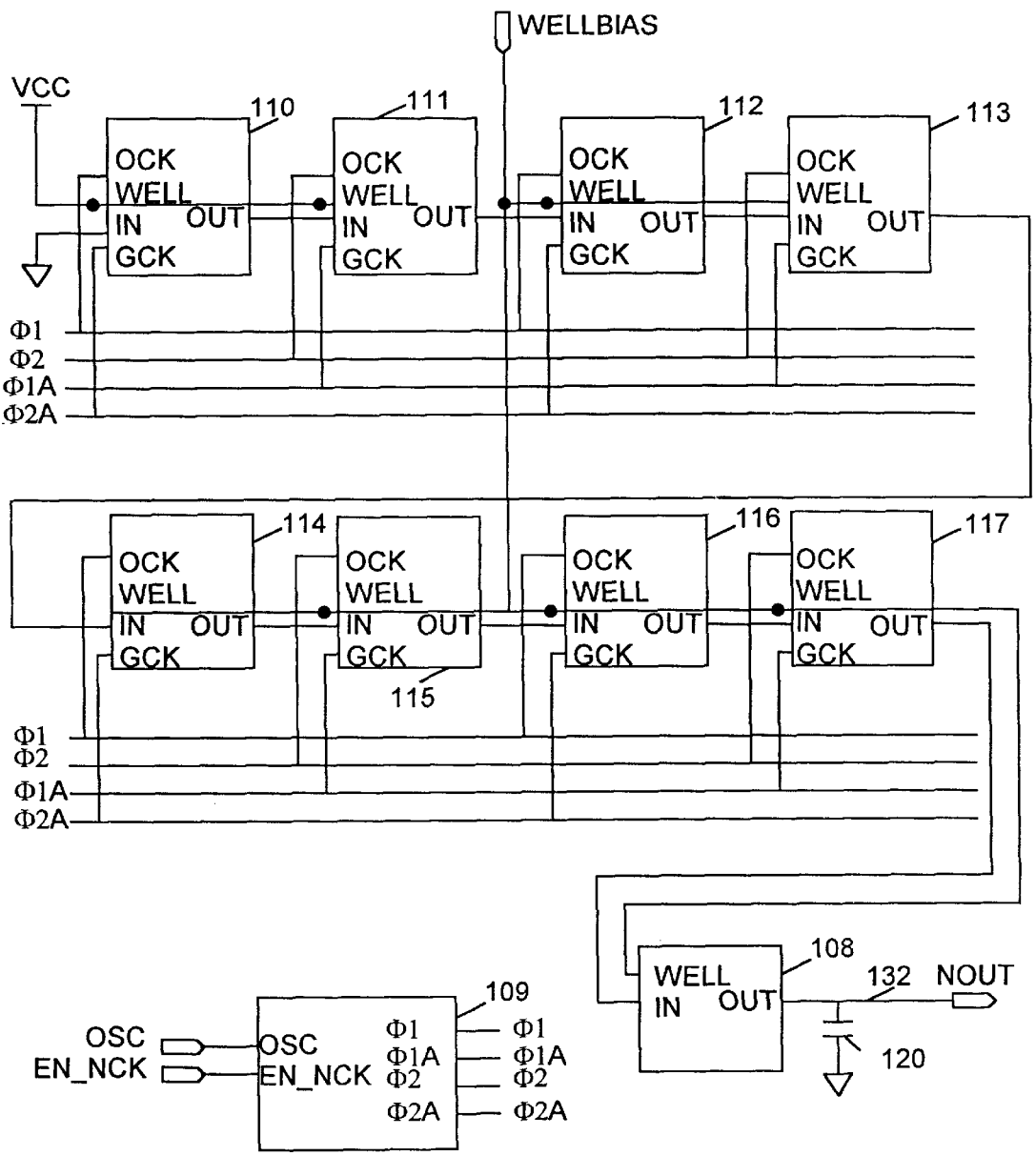
FIG. 1 illustrates a block diagram of an eight stage prior art charge pump system.
Figure 2:
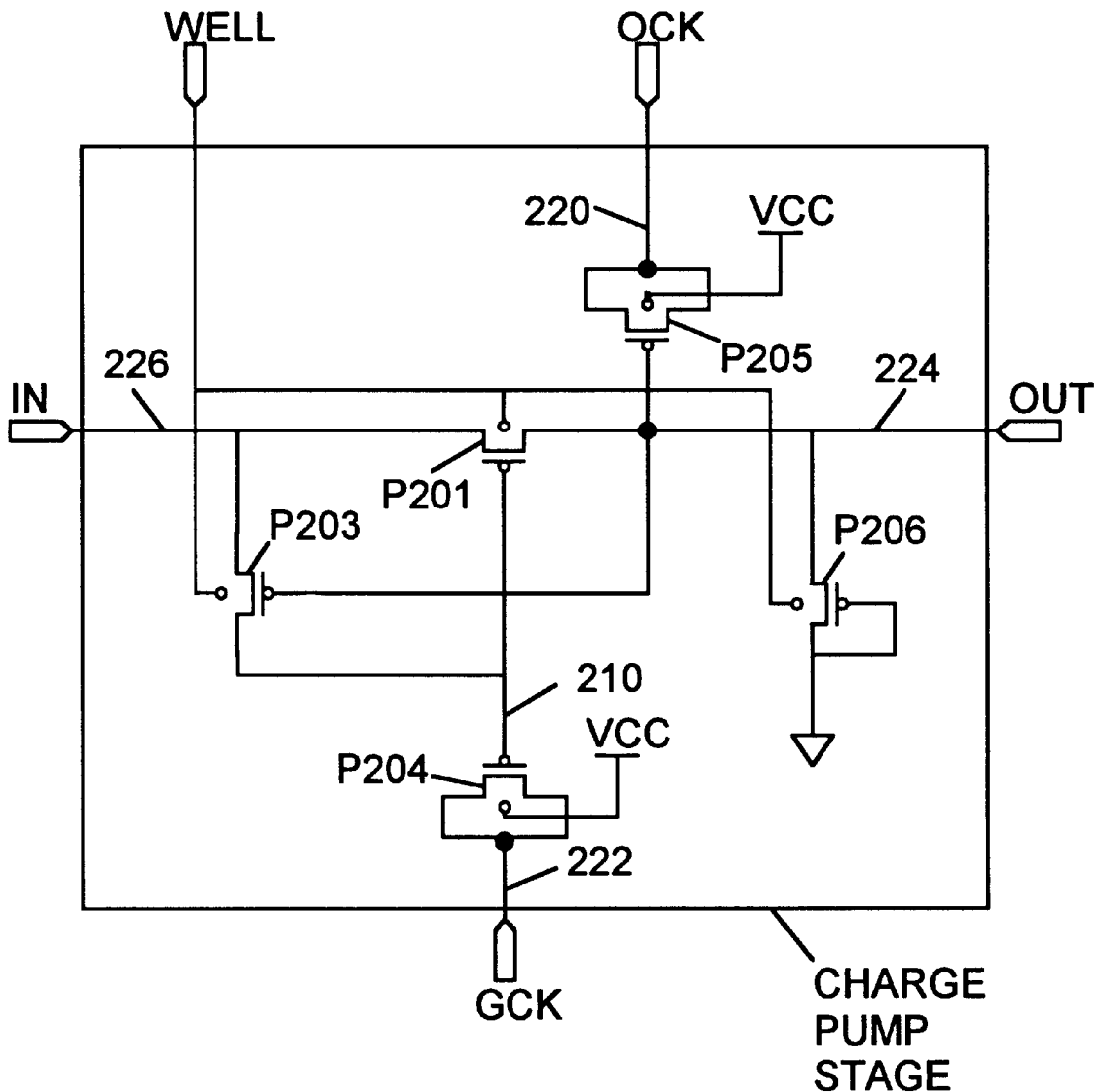
FIG. 2 illustrates a circuit diagram of a conventional charge pump stage for charge pump stages 110–117 shown in FIG. 1.
Figure 3:
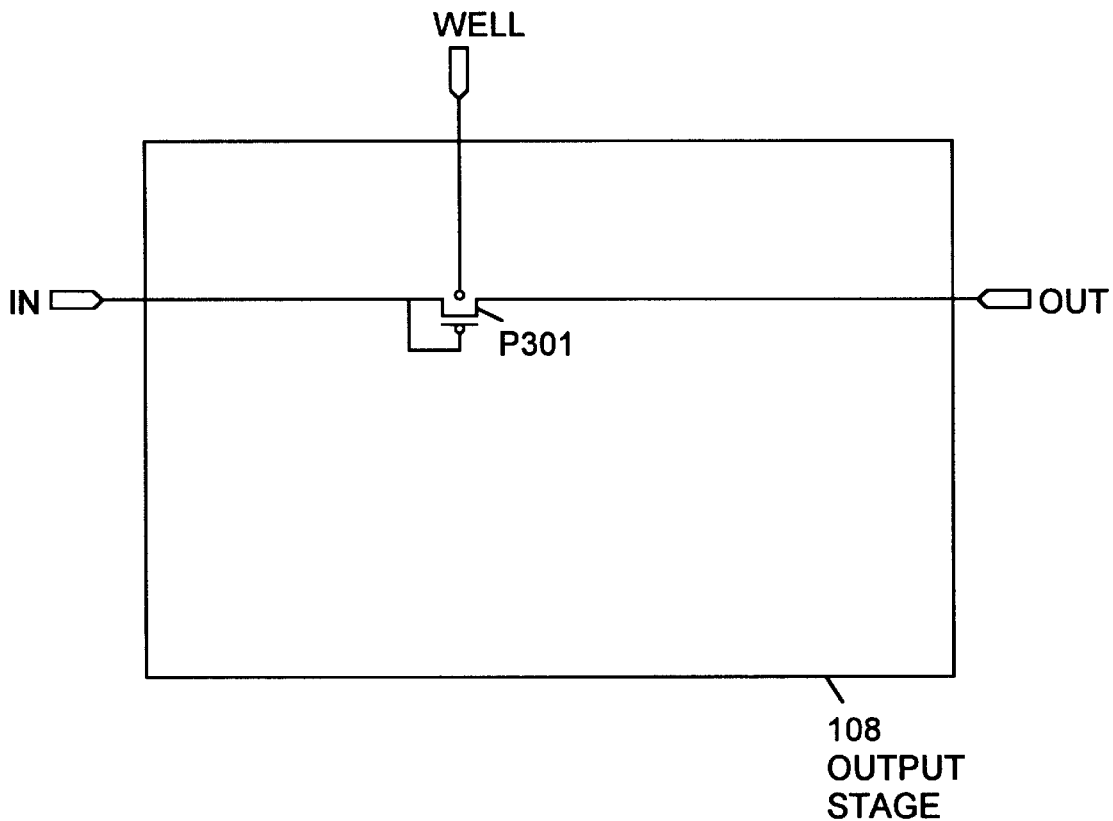
FIG. 3 illustrates a circuit diagram of a conventional output stage 108 shown in FIG. 1.
Figure 4:
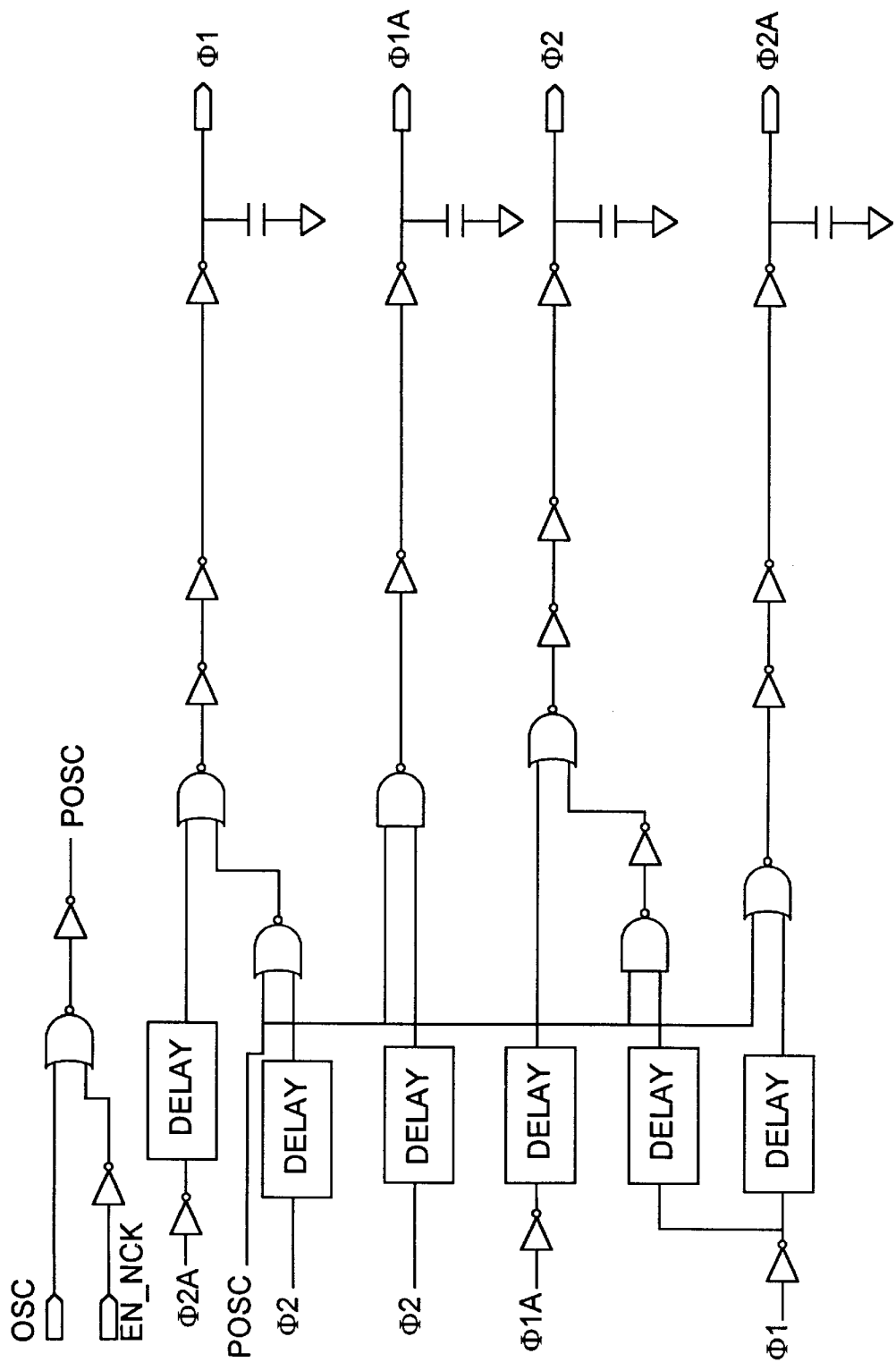
FIG. 4 illustrates a logic diagram of a four phase clock for the charge pump system of FIG. 1.
Figure 5:
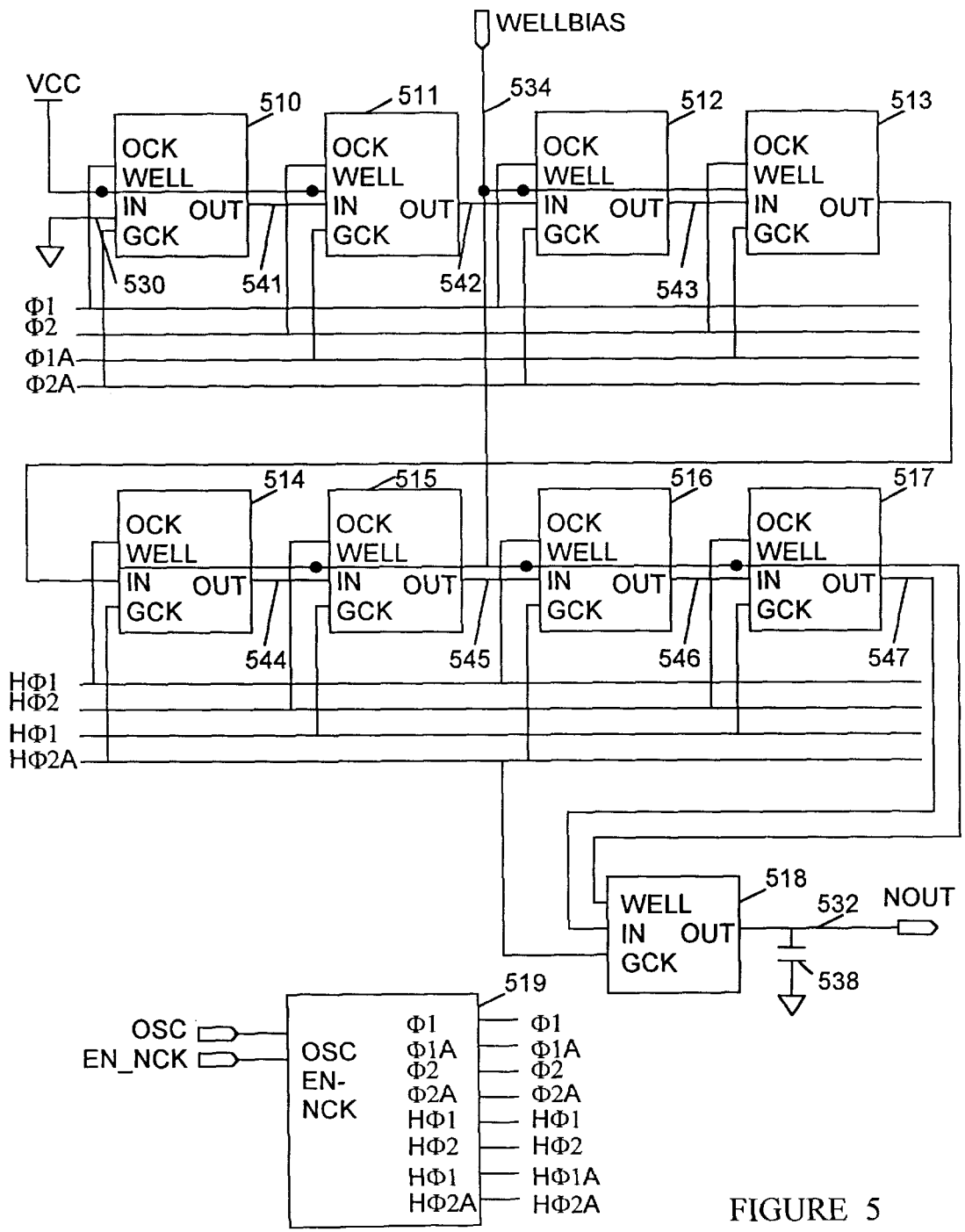
FIG. 5 illustrates a block diagram of an eight stage charge pump system according to one embodiment of the present invention.
Figure 6:
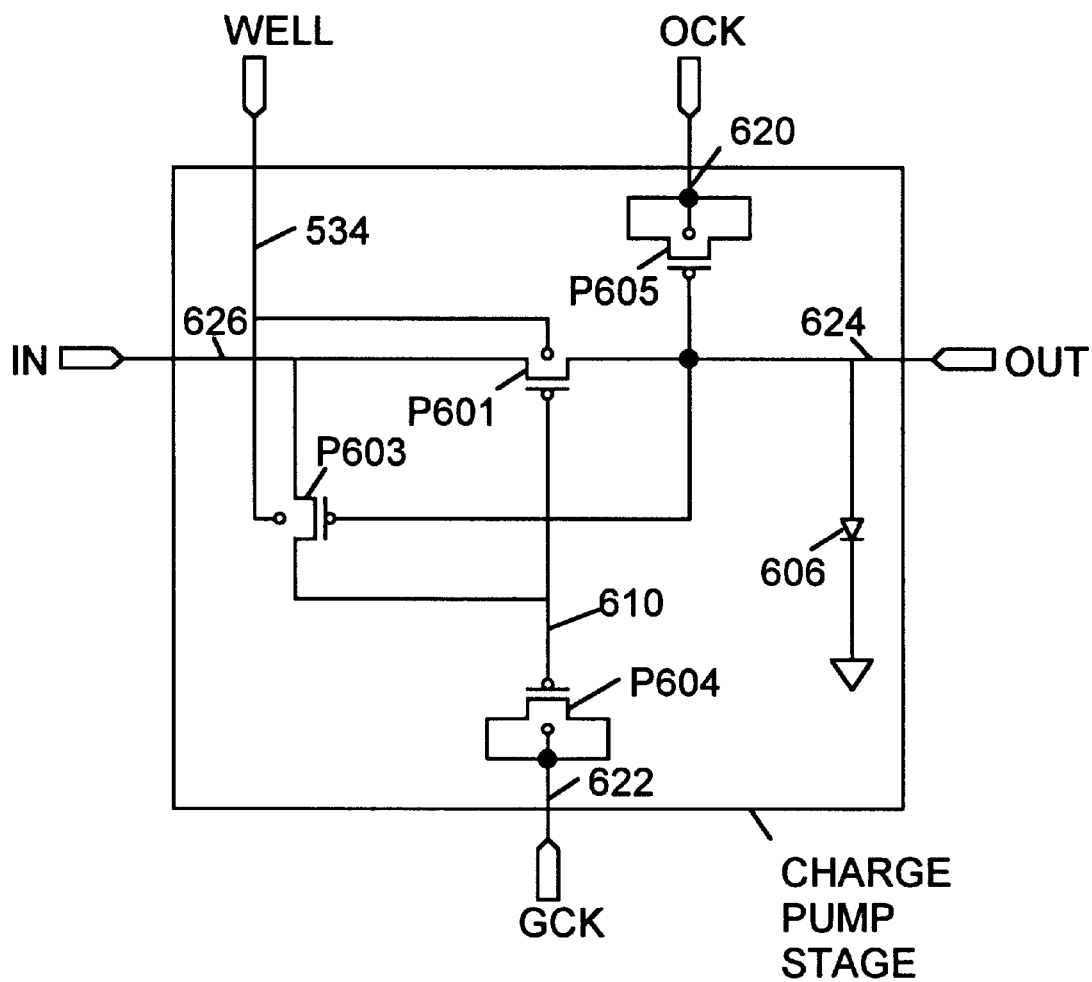
FIG. 6 illustrates a circuit diagram of a charge pump embodiment for charge pump stages 514–517 of the charge pump system of FIG. 5 according to one embodiment of the present invention.

The present invention provides a low voltage charge pump with a large voltage output range. FIG. 5 illustrates a block diagram of an eight stage charge pump system according to one embodiment of the present invention. The system is comprised of eight charge pumps 510–517, an output stage 518, and a four phase clock generator 519. The eight charge pump stages are coupled in series, followed by the output stage 518. Charge pumps 510–513 are comprised of a first charge pump circuit, an embodiment of which is illustrated in FIG. 2. Charge pumps 514–517 are comprised of a second charge pump circuit, an embodiment of which is illustrated in FIG. 6. Clock generator 519 generates two groups of four clock signals. The first group of signals $\Phi 1$, $\Phi 1A$, $\Phi 2$ and $\Phi 2A$ are coupled to charge pumps 510–513. The second group of clock signals $H\Phi 1$, $H\Phi A$, $H\Phi 2$ and $H\Phi 2A$ are coupled to charge pumps 514–517.

The general operation of the charge pump system is that the falling edge of the clock signal coupled to the OCK clock terminal provides negative charge to the charge pump output. This negative charge is coupled to the following charge pump stage. The rising edge of the clock signal coupled to the OCK clock terminal provides positive charge to each charge pump stage output. This positive charge is coupled to the preceding charge pump stage. As this cycle is repeated, positive charge is transferred to ground node 530 and negative charge is transferred to NOUT 532 to provide a large negative output voltage, for example, −10 V.

Charge Pump Stages

To clarify how the charge is coupled to preceding and subsequent charge pump stages, the operation of the charge pump is described. FIG. 6 illustrates a circuit diagram of a charge pump embodiment for charge pump stages 514–517 of the charge pump system of FIG. 5 according to one embodiment of the present invention. The charge pump is comprised of a large PMOS capacitor P605, a small PMOS capacitor P604, a PMOS pass transistor P601, a PMOS transistor P603, and a p-n junction diode 606. PMOS capacitors P604 and P605 are each comprised of a PMOS transistor with the transistor's source and drain terminals coupled together to form a capacitor. The substrate terminal of each of the transistors P604 and P605 is also coupled to the source and drain terminals to avoid forward biasing the p-n junction of the source-drain to the N-well, as will be described below.

Figure 8:
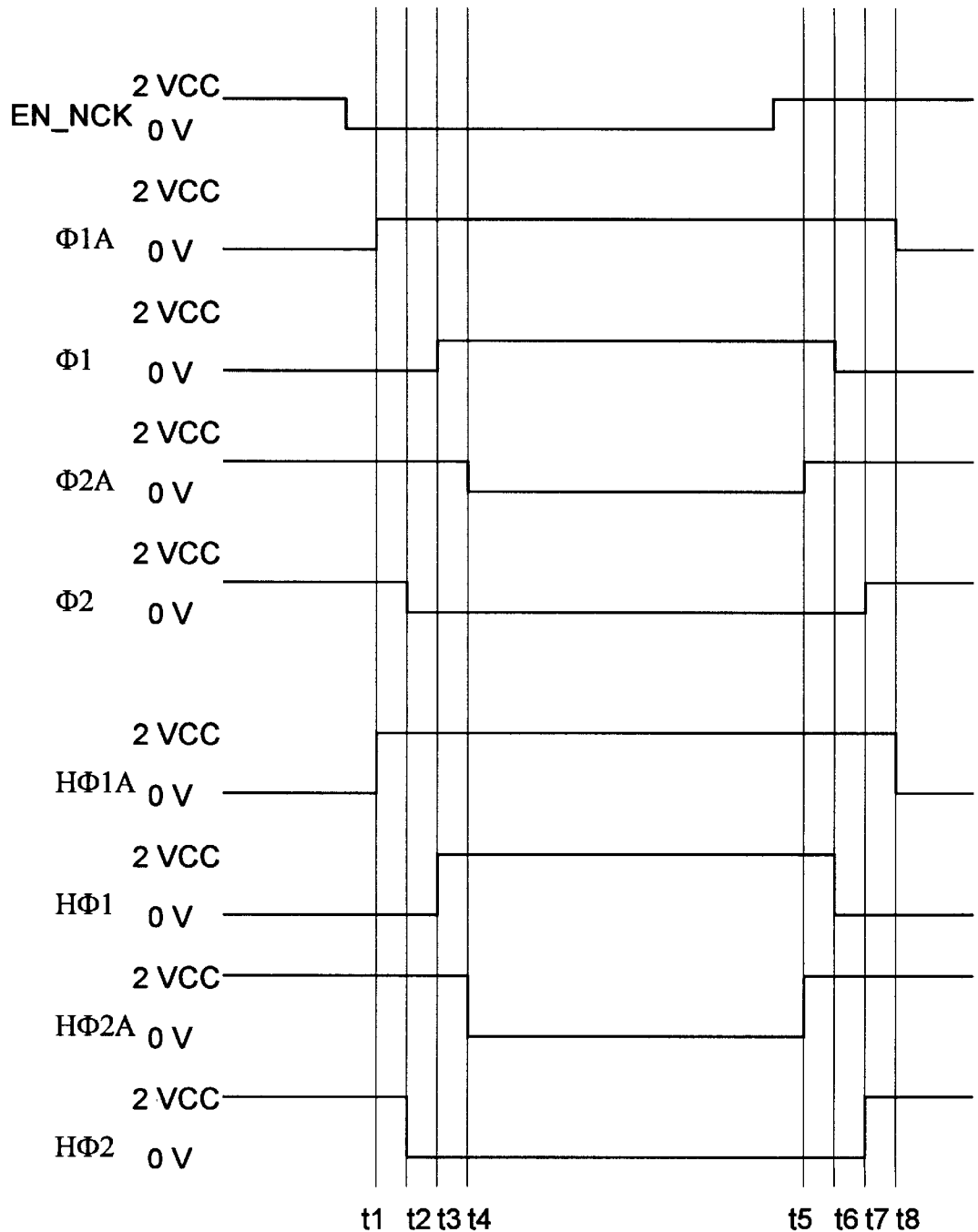
FIG. 8 illustrates a timing diagram of the clock signals in the charge pump system of FIG. 5 according to one embodiment of the present invention.

As an example of the functional relationship between the charge pump stages, the transfer of charge by charge pump 516 to charge pumps 515 and 517 is described. The clock signals $H\Phi 1$, $H\Phi 1A$, $H\Phi 2$ and $H\Phi 2A$ are illustrated in FIG. 8. For charge pump 516, the $H\Phi 1$ clock signal is coupled to the OCK 620 clock terminal. $H\Phi 2A$ is coupled to the GCK 622 clock terminal. Referencing FIG. 8, at time t5 the $H\Phi 2A$ signal goes high. The $H\Phi 2A$ rising edge is AC coupled through PMOS capacitor P604 to the gate of PMOS pass transistor P601, which turns transistor P601 off. At time t6 the $H\Phi 1$ signal goes low. The DC component of the $H\Phi 1$ signal is isolated by PMOS capacitor P605. The AC component of the $H\Phi 1$ signal, namely the falling edge, is coupled to node 624 which transfers negative charge from OCK terminal 620 to node 624, which for charge pump 516 is coupled to the input of charge pump 517. This decreases the voltage level at node 624. Transistor P601 being off prevents the negative charge at node 624 from being transferred to the preceding charge pump 515. Clock signal $H\Phi 1A$ is coupled to the GCK clock terminal of charge pump 517. At time t8 $H\Phi 1A$ goes low, which turns on the PMOS pass transistor 601 in charge pump 517. This couples the negative charge from charge pump 516 to the output of charge pump stage 517.

The transfer of positive charge from a charge pump to the preceding charge pump operates as follows. $H\Phi 1A$ is coupled to the GCK 622 terminal of charge pump 517. When $H\Phi 1A$ goes high at time t1, it turns the PMOS pass transistor P601 in charge pump 517 off. $H\Phi 1$ is coupled to the OCK 620 terminal of charge pump 516. At time t3 when $H\Phi 1$ goes high, positive charge is coupled through the large PMOS capacitor P605 to node 624. This charge is prevented from being transferred through charge pump 517 because the pass transistor P601 in charge pump 517 is off. At time t4 $H\Phi 2A$ goes low. $H\Phi 2A$ is coupled to the GCK 622 terminal in charge pump 516. $H\Phi 2A$ going low turns the PMOS pass transistor P601 in charge pump 516 on. This couples the positive charge from node 624 to the input of charge pump 516 and to the preceding charge pump, charge pump 515.

The rising edges of the clock signal coupled to GCK 622 are coupled through capacitor configured PMOS transistor P604 to node 610. When node 610 rises more than a threshold voltage above node 624 which is coupled to the gate of PMOS transistor P603, the positive charge from node 610 is coupled through transistor P603 to IN 626, and back through the preceding charge pumps to ground.

The charge pump system of FIG. 5 repeats this process of transferring negative charge towards the output and transferring positive charge back towards ground at each clock cycle. The charge pump system incrementally increases the negative voltage at output NOUT 532. In one embodiment, a −10 V output voltage level is achieved after approximately 100 clock cycles.

The large negative voltages generated by the charge pump system causes an increase in the threshold turn-on voltage of the transistors due to the body effect. The threshold voltage $V_T$ for PMOS transistors increases with the bulk (substrate) to source voltage according to the equation $V_T=V_{TO}-\gamma(\sqrt{(\Phi+V_{BS})} -\sqrt{(\Phi)})$, for PMOS transistors where $V_{BS}$ is the bulk to source voltage, $V_{TO}$ is threshold voltage for $V_{BS}=0$, $\gamma$ is the bulk threshold parameter and $\Phi$ is the strong inversion surface potential. As the negative output voltage at each stage is increased the bulk to source voltage increases. In FIG. 6 the bulk is labeled WELL 534. For example, when charge pump output node 624 is at −9 V, the source of PMOS pass transistor P601 in the following charge pump stage is also at −9 V. The VCC for a low voltage circuit may be 2.5 V, which can cause the $V_T$ for a transistor with the well coupled to VCC, to be 2.2 V. Referring to FIG. 6, the reduction in the voltage of node 610 caused by a falling edge of the clock signal coupled to GCK 622 is typically not large enough to exceed a 2.2 V threshold voltage. When the GCK signal is insufficient to turn on the PMOS pass transistor P601 the charge pump loses its ability to provide sufficient output current. As a result, the body effect limits the output voltage capability of conventional charge pump systems.

The body effect is reduced by lowering the WELLBIAS 534 voltage. As illustrated in FIG. 6, WELLBIAS 534 is coupled to the substrate terminal of PMOS pass transistor P601. Therefore the larger the substrate voltage the larger the body effect. It is important to keep the substrate at a sufficiently high voltage to ensure that the p-n junction between the drain or source of a transistor and the well is not turned on, which can cause latch-up. To reduce the body effect while protecting against latch-up, the WELLBIAS 534 voltage is reduced from VCC to 0 V after all the nodes coupled to WELLBIAS are below 0 V⁻. For example, in one embodiment, the WELLBIAS 534 voltage is reduced to 0 V when NOUT 532 is less than −5 V. In this embodiment, when NOUT 532 is less than −5 V, charge pump input/output nodes 541–547 are less than 0 V.

To extend the output voltage range beyond that attainable by merely switching the WELLBIAS 534 voltage, one embodiment of the present invention provides two sets of clock signals, one of which has a bootstrapped voltage high level greater than VCC. A first set of clock signals having a high voltage level of, for example VCC, are coupled to charge pump stages where the body effect is not a problem. For charge pump stages where the body effect may make the first clock signal voltage high level inadequate to reliably turn on the pass transistor, a second set of clock signals with a greater high voltage level is provided. In the charge pump system of FIG. 5, the first set of clock signals comprises signals Φ1, Φ2, Φ1A and Φ2A. These four clock signals are coupled to charge pump stages 510 through 513. The second set of clock signals comprises signals Φ1, HF1A, HF2 and HΦ2A. These four clock signals are coupled to charge pump stages 514–517. In one embodiment, the first set of clock signals switch from 0 to VCC and the second set of clock signals switch from 0 to 2 VCC as illustrated in FIG. 8. Providing a 2 VCC voltage swing at the higher output voltage charge pump stages 514–517 is sufficient to turn on the pass transistor 601 to, for example, provide a −10 V output voltage with a 2.5 V VCC supply. The operation of charge pump stages 514–517 is further enhanced by p-n junction diode 606. When the OCK clock signal switches high, the rising edge is AC coupled to output node 624 which causes the node 624 voltage to increase. When the DC voltage level of OUT 624 is near ground, diode 606 prevents the OUT 624 voltage from rising above the turn-on voltage of the diode which may be, for example, 0.7 V. Using a p-n junction diode rather than a diode configured transistor provides a stronger clamp on the OUT 624 positive voltage.

Four Phase Clock

Figure 9:
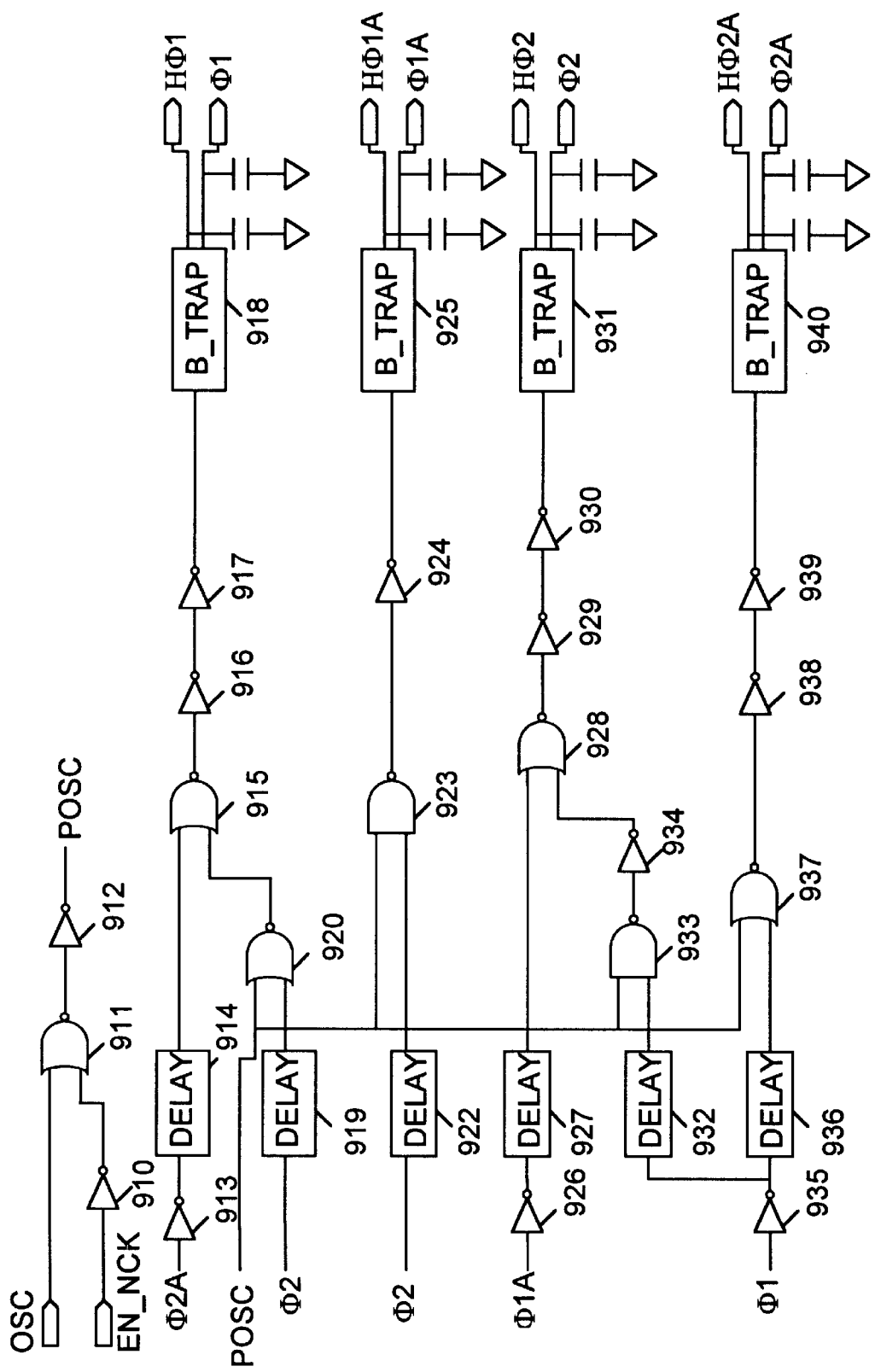
FIG. 9 illustrates a logic diagram of a four phase clock signal generator for the charge pump system of FIG. 5 according to one embodiment of the present invention.

FIG. 9 illustrates a logic diagram of a four phase clock signal generator for the charge pump system of FIG. 5 according to one embodiment of the present invention. The eight clock signals generated by the FIG. 9 clock are illustrated in FIG. 8. The FIG. 9 clock is essentially comprised of four sections. Each section has a clock signal input, the signal is delayed, and then delayed further based on the input of one or more other clock signals. Next, the clock signal is bootstrapped to a higher voltage, such as 2 VCC, by one of the bootstrap circuits 918, 925, 931 and 940. The bootstrap circuits each provide a bootstrapped HΦ high voltage output clock signal, and a non-bootstrapped Φ signal. The two output clock signals from the bootstrap circuit have the same phase, but different voltage high levels.

Figure 10:
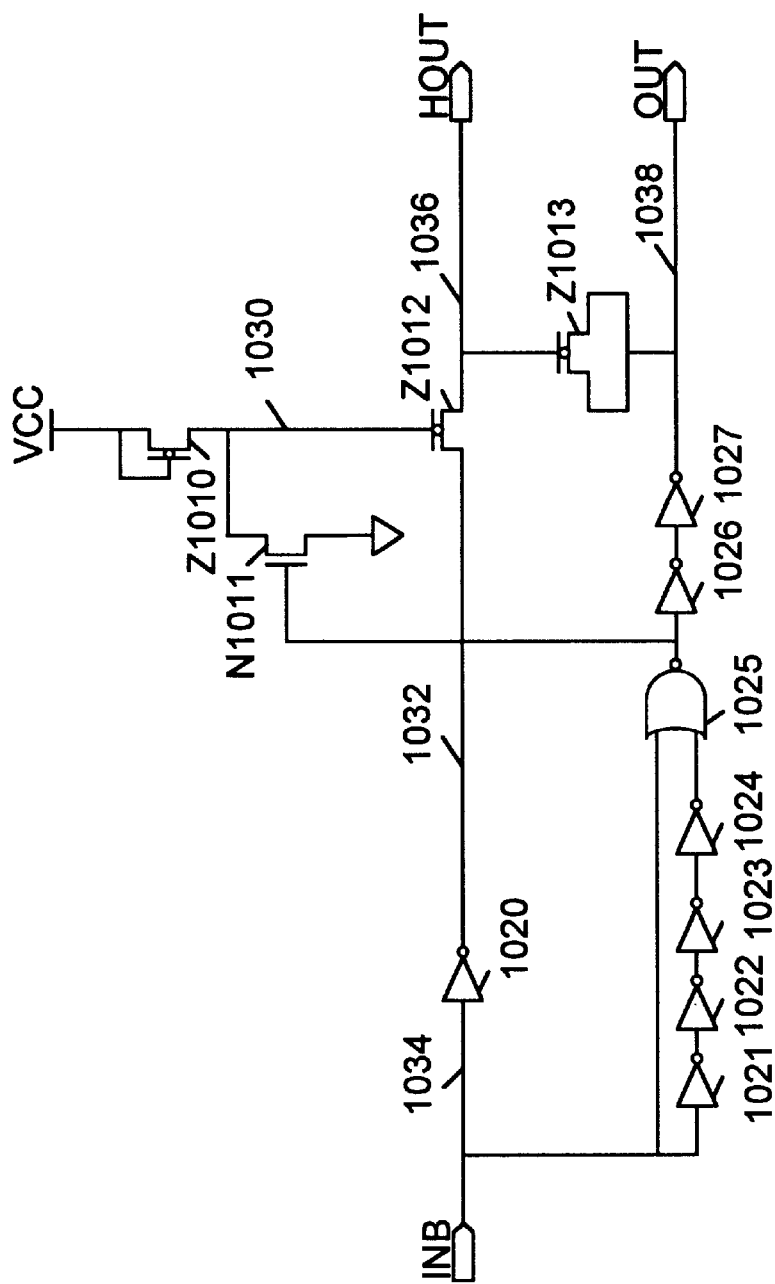
FIG. 10 illustrates a circuit diagram of a bootstrap circuit for the four phase clock signal generator of FIG. 9 according one embodiment of the present invention.

In operation, an oscillator signal is provided to one input of NOR gate 911. A clock enable signal is inverted by inverter 910 and provided to the other input of NOR gate 911. The output of NOR gate 911 is coupled through inverter 912 to NOR gate 920. The signal then enters the feedback block of the clock generator. The feedback block is described using the initial conditions illustrated in the FIG. 8 timing diagram. The high POSC signal is provided to an input of NOR gate 920. In one embodiment delay cells 914, 919, 922, 927, 932 and 936 provide a 2 ns delay. The high input at NOR gate 920 cause the NOR gate output to be low. The Φ2A signal at the input of inverter 913 also switches to high, which causes the inverter 913 output to be low. The low signal is delayed by delay 914 and then coupled to the input of NOR gate 915. With both inputs low, NOR gate 915 provides a high level output, which is inverted to a low level by inverter 916, and inverted to a high level by inverter 917. The inverter 917 output is coupled to the input of bootstrap circuit 918. An embodiment of the bootstrap circuit for bootstrap cells 918, 925, 931 and 940 is illustrated in FIG. 10. The bootstrap circuit 918 inverts the signal to provide a low level signal at the Φ1 and HΦ1 outputs. As illustrated in FIG. 5, the HΦ1 output is coupled to the OCK clock terminals of charge pump stages 514 and 516. The Φ1 output is coupled to OCK clock terminals of charge pump stages 510 and 512, illustrated in FIG. 5, as well as to the input of inverter 935 illustrated in FIG. 9. The Φ1 signal is then coupled through a series of delays, logic gates, inverters, and another bootstrap stage to provide the Φ2, HΦ2, Φ2A and HΦ2A clock signals. Next, the Φ2A signal is fed back to the input of inverter 913 and the cycle repeats.

The operation of the remainder of the feedback block is similar to the operation of the described Φ2A to Φ1 signal path. The general relationship of the clock signals created by the FIG. 9 four phase clock generator circuit is that when ΦA goes high, Φ2 goes low after a delay. Φ2 going low causes Φ1 to go high, which in turn causes Φ2A to go low. Thus, Φ1 and Φ1A move in the same direction separated by a delay, and Φ2 and Φ2A move in the direction opposite to that of Φ1 and Φ1A, also separated by a delay.

Bootstrap Circuit

The bootstrap cells 918, 925, 931 and 940 provide the bootstrapped high logic level for the Φ set of clock signals. For example, in one embodiment, the HΦ clock signals switch from 0 to 2 VCC and the Φ clock signal switch from 0 to VCC. The bootstrap circuits thus bootstrap the input logic high level from VCC to about 2 VCC. FIG. 10 illustrates an embodiment of a bootstrap circuit. The bootstrap circuit is generally comprised of two signal paths. The first signal path is comprised of the series of inverters 1021–1024 coupled to the INB 1034 input and to NOR gate 1025, followed by two more inverters coupled to the output of NOR gate 1025 and to one of the bootstrap outputs OUT 1038. This first signal path provides the Φ set of clock signals. The output OUT 1038 is the inverse of the INB 1034 signal, and switches between the same logic high and low levels as the INB 1034 input. The second signal path is comprised of inverter 1020 coupled to native mode pass transistor Z1012. The native mode transistor Z1012 source/output is coupled to HOUT 1036. The second signal path provides the HΦ set of clock signals. The HOUT 1036 output high level is bootstrapped to a higher level than the logic high level of the INB 1034 signal, for example, 2 VCC. The FIG. 10 bootstrap circuit further includes NMOS pull down transistor N1011, native mode transistor Z1013 configured as a coupling capacitor, and diode configured native mode transistor Z1010. Native mode transistors are NMOS transistors that have a lower threshold voltage than typical NMOS enhancement mode transistors. A typical native mode transistor threshold is 0.2 V, whereas a typical NMOS enhancement mode transistor threshold voltage is 0.7 V.

In operation, when the INB 1034 input of FIG. 10 is high, the high level signal is coupled to an input of NOR gate 1025 which makes the output of NOR gate 1025 low. The output of NOR gate 1025 is then coupled to two inverters 1026 and 1027 to the output OUT 1038. The output of NOR gate 1025 is also coupled to the gate of NMOS transistor N1011. The low NOR gate output turns transistor N1011 off. Native mode transistor Z1010 is configured as a diode, which with transistor N1011 off, drives node 1030 to VCC-V$_T$ volts. This turns on native mode pass transistor Z1012. With transistor Z1012 on, the INB 1034 high level signal is inverted by inverter 1020 and is coupled to HOUT 1036, driving HOUT 1036 low.

When the INB 1034 input signal goes low, inverter 1020 provides a high level signal to native mode pass transistor Z1012 which is on as described above. Transistor Z1012 then drives the HOUT 1036 output to the INB 1034 high level, which is typically VCC. The low INB 1034 input signal is also directly coupled to an input of NOR gate 1025. The NOR gate output is initially low from the preceding high INB 1034 input signal. After the delay caused by inverters 1021–1024 when the low INB 1034 signal reaches the second NOR gate 1025 input, NOR gate 1025 goes high. The high NOR gate 1025 output turns on NMOS transistor N1011. Transistor N1011 then pulls down node 1030 to ground. This turns off native mode pass transistor Z1012, which thereby isolates HOUT 1036 from INB 1034. The high level output of NOR gate 1025 is also coupled to OUT 1038 through inverters 1026 and 1027, causing OUT 1038 to go high. Because of the delay imposed by inverters 1021–1024, 1026 and 1027, OUT 1038 does not go high until after HOUT 1036 has already transitioned high and transistor Z1012 is off. The OUT 1038 high transition is AC coupled to HOUT 1036 through native mode transistor Z1013 which is configured as a capacitor. This bootstraps the HOUT 1036 output to, for example, 2 VCC.

The bootstrapped HΦ set of clock signals provide the higher turn-on voltages used to turn on pass transistors that have increased threshold voltages due to the body effect. However, because the HΦ high level signals can be two times that of VCC, preventative measures should be taken to prevent the high level HΦ signals from forward biasing the drain-source to well p-n junction of PMOS transistors P604 and P605 in the charge pump stages, illustrated in FIG. 6. To prevent forward biasing that junction the well of transistor P604 is coupled to the P604 source and drain terminals. Similarly, the well of transistor P605 is coupled to the P605 source and drain terminals.

Output Stage

Figure 7:
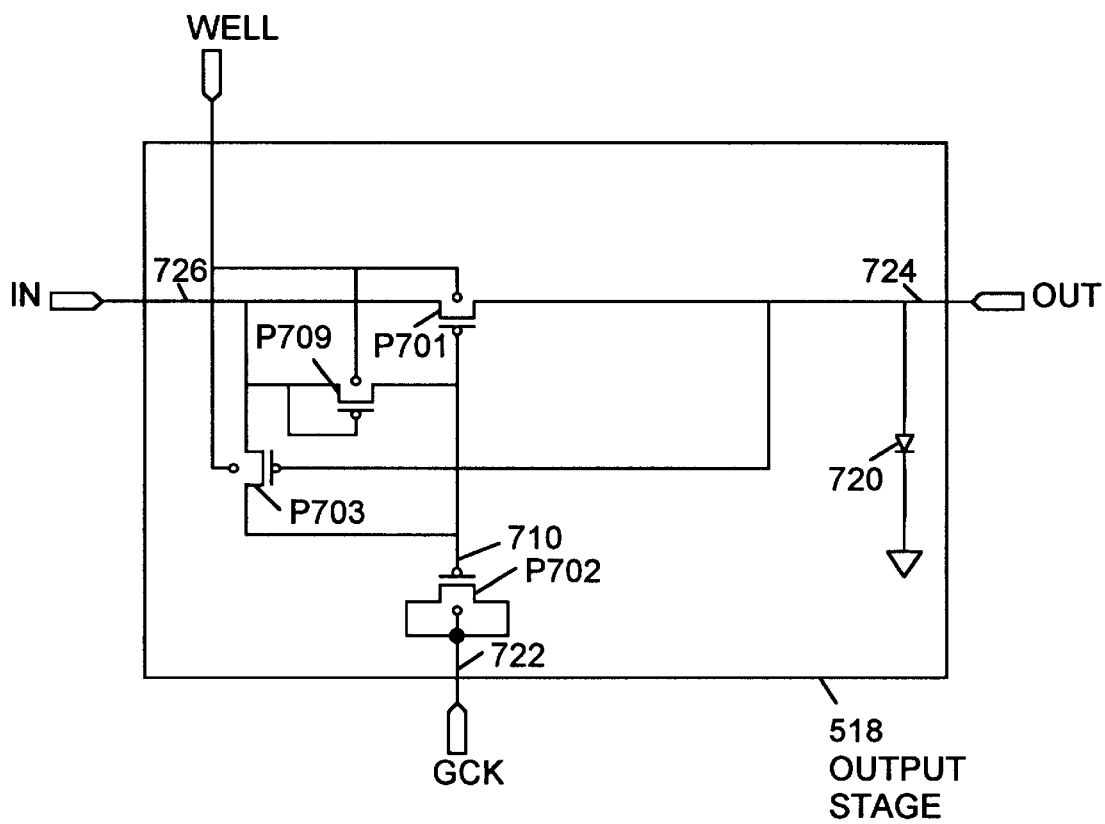
FIG. 7 illustrates a circuit diagram of an output stage of the charge pump system of FIG. 5 according to one embodiment of the present invention.

After charge pump stages 510–517, the negative voltage is coupled to output stage 518. FIG. 7 illustrates a circuit diagram of output stage 518 according to one embodiment of the present invention. The output stage of FIG. 7 includes diode configured PMOS transistor P709, a p-n junction diode 720 coupled to OUT 724, PMOS pass transistor P701, and a capacitor configured PMOS transistor P702.

When IN 726 goes low, the gate of transistor P701 also goes low through the diode connected transistor P709. Then similar to the charge pump stages, when the clock signal at GCK 722 goes low, the falling edge is AC coupled through capacitor configured PMOS transistor P702 to further reduce the node 710 voltage, which turns on PMOS pass transistor P701. With transistor P701 on negative charge is coupled from IN 726 to OUT 724. Coupling negative charge through diode configured transistor P709 before GCK 722 goes low increases the negative voltage at the pass transistor gate, node 710. When GCK 722 goes low, to turn on pass transistor P701, this larger negative voltage increases the conductance of the pass transistor and therefore the efficiency of the output stage. Further techniques for maximizing the efficiency of charge transfer stages are described in co-pending patent application Ser. No. 08/917,008, filed Aug. 21, 1997, now U.S. Pat. No. 5,886,566, and entitled "High Voltage Charge Transfer Stage," assigned to the assignee of the present invention and incorporated herein by reference.

OUT 724 is coupled to the output of the charge pump system NOUT 523, which in turn may be coupled to the gates of transistors in a flash memory array. GCK 722 is coupled to the HΦ2A clock signal, which is one of the high voltage clock signals. HΦ2A may have a logic high level of 2 VCC. To prevent this high voltage signal from forward biasing the p-n junction between the PMOS transistor P702 source or drain and the N-well, the N-well is coupled to the source and drain. Coupling the source, drain and the N-well ensures that the voltage across the p-n junction between the source or drain and the N-well will be kept below the turn-on voltage.

The p-n junction diode 720 is coupled between OUT 724 and ground. Similar to diode 606 shown in FIG. 6, diode 720 prevents the OUT 724 voltage from rising above the turn-on voltage of the diode, which may be 0.7 V. Here again, using a p-n junction diode rather than a diode configured transistor provides a stronger clamp on the OUT 724 positive voltage level.

Rising edges of the clock signal coupled to GCK 722 are AC coupled to node 710 and cause an increase in the node 710 voltage. This turns on PMOS transistor P703 which couples the positive charge to IN 726 and eventually back through the other charge pump stages 510–517 to ground.

Thus the present invention provides a low voltage charge pump system with a large output voltage range.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A charge pump system fabricated on a substrate comprising:

a first plurality of charge pumps, said first plurality of charge pumps coupled in series, each of said first plurality of charge pumps having a plurality of clock terminals coupled to respective ones of a first set of at least four distinct clock signals, each clock signal of said first set of clock signals having a first logic high level; and a second plurality of charge pumps, said second plurality of charge pumps coupled in series, a first output terminal of a one of said first plurality of charge pumps, coupled in series to a second input terminal of a one of said second plurality of charge pumps, each of said second plurality of charge pumps having a plurality of clock terminals coupled to respective ones of a second set of at least four distinct clock signals, each clock signal of said second set of clock signals having a second logic high level;

wherein
        said first plurality of charge pumps are clocked only by said first set of clock signals and said second plurality of charge pumps are clocked only by said second set of clock signals; and
        said second logic high level is greater than said first logic high level so as to enable said second plurality of charge pumps to provide an output voltage at each of said second output terminals that is greater than a voltage at the first output terminal of said one of said first plurality of charge pumps.

2. The charge pump system of claim 1 wherein each of said second plurality of charge pumps comprises:

a first capacitor having a first and second terminal, said first terminal coupled to said third clock terminal and to said substrate, said second terminal coupled to said charge pump output terminal;

a first transistor having a first, second, and third terminal, said first terminal coupled to said charge pump input, said second terminal coupled to said charge pump output terminal;

a second capacitor having a first and second terminal, said first terminal coupled to said fourth clock terminal and to said substrate, said second terminal coupled to said first transistor third terminal.

3. The charge pump system of claim 2 wherein said first capacitor comprises a capacitor configured transistor having source, drain and gate terminals, said source and drain terminals coupled to said first terminal of said first capacitor, said gate terminal coupled to said second terminal of said first capacitor.

4. A charge pump system fabricated on a substrate comprising:

a first plurality of charge pumps, said first plurality of charge pumps coupled in series, each of said first plurality of charge pumps having a first clock terminal, a second clock terminal, a first input terminal and a first output terminal, said first clock terminal being coupled to a first one of a first set of clock signals and said second clock terminal being coupled to a second one of said first set of clock signals, each clock signal of said first set of clock signals having a first logic high level; and a second plurality of charge pumps said second plurality of charge pumps coupled in series, a first output terminal of a one of said first plurality of charge pumps coupled in series to a second input terminal of a one of said second plurality of charge pumps, each of said second plurality of charge pumps having a third clock terminal, a fourth clock terminal, and a second output terminal, said third clock terminal being coupled to a first one of a second set of clock signals and said fourth clock terminal being coupled to a second one of said second set of clock signals, each clock signal of said second set of clock signals having a second logic high level, wherein said second logic high level is greater than said first logic high level so as to enable said second plurality of charge pumps to provide an output voltage at each of said second output terminals that is greater than a voltage at the first output terminal of said one of said first plurality of charge pumps;

wherein each of said second plurality of charge pumps further comprises a first p-n junction diode having a first and second terminal, said first terminal coupled to said charge pump output terminal, said second terminal coupled to a circuit ground.

5. The charge pump system of claim 4 further comprising an output circuit, said output circuit comprising a second transistor, a third transistor, an input terminal, and an output terminal;

said second transistor having a first, second and third terminal, said first terminal coupled to said output circuit input terminal, said second terminal coupled to said output circuit output terminal;

said third transistor having a first, second and third terminal, said first terminal and said third terminal coupled to said output circuit input terminal, said second terminal coupled to said third terminal of said second transistor.

6. The charge pump system of claim 5 wherein said output circuit further comprises a third capacitor, and a fifth clock terminal;

said third capacitor having a first terminal and a second terminal, said first terminal coupled to said fifth clock terminal and to said substrate, said second terminal coupled to said second transistor third terminal.

7. The charge pump system of claim 6 wherein said third capacitor comprises a capacitor configured transistor having a source, drain, gate and well terminal, said source, drain and well terminal coupled to said first terminal of said third capacitor, said gate coupled to said second terminal of said third capacitor.

8. The charge pump system of claim 7 wherein said output circuit further comprises a second p-n junction diode having a first and second terminal, said first terminal coupled to said output circuit output terminal, said second terminal coupled to ground.

9. The charge pump of claim 8 wherein said output circuit output terminal is coupled to a plurality of flash memory array cell gates so as to provide an erase voltage signal.

10. The charge pump system of claim 9 wherein said first plurality of charge pumps comprises four low power supply voltage negative charge pumps; and wherein said second plurality of charge pumps comprises four low power supply voltage negative charge pumps.

11. The charge pump system of claim 10 wherein each of said four clock terminals receives a clock having a different phase.

12. A method of providing charge comprising the steps of:

applying a first plurality of clock signals to a first plurality of serially coupled charge pumps using a first logic high level;

applying a second plurality of clock signals to a second plurality of serially coupled charge pumps using a second logic high level, wherein said second logic high level is greater than said first logic high level, an input of a one of the second plurality of serially coupled charge pumps being coupled to an output of a one of the first plurality of serially coupled charge pumps; and clamping a respective output of each of the second plurality of serially coupled charge pumps with a p-n junction diode coupled between said respective output of the charge pump and a circuit ground.

13. The method of claim 12 wherein said second logic high level is greater than a power supply voltage of the charge pumps.

14. The method of claim 13 wherein each of the first plurality and second plurality of serially coupled charge pumps reside on a substrate and wherein each of said second plurality of charge pumps has a capacitor coupled to one of said second plurality of clock signals, said capacitor having a first terminal coupled to the substrate and to a clock terminal of the charge pump.

15. The method of claim 12 wherein said step of applying said second plurality of clock signals further comprises the steps of:

applying a first clock signal to a first charge pump of said second plurality of charge pumps;

applying a second clock signal to said first charge pump;

a third clock signal to a second charge pump of said second plurality of charge pumps;

applying a fourth clock signal to said second charge pump; and wherein said first clock signal switches high at a first time, said second clock signal switches low at a second time after the first time, said third clock signal switches high at a third time after the second time, said fourth clock signal switches low at a fourth time after the third time, said fourth clock signal switches high at a fifth time after the fourth time, said third clock signal switches low at a sixth time after the fifth time, said second clock signal switches high at a seventh time after the sixth time, and said first clock signal switches low at an eighth time after the seventh time.

16. The method of claim 15 wherein said step of applying said first plurality of clock signals further comprises the steps of:

applying a fifth clock signal to a third charge pump of said first plurality of charge pumps;

applying a sixth clock signal to said third charge pump;

applying a seventh clock signal to a fourth charge pump of said first plurality of charge pumps; and applying an eighth clock signal to said fourth charge pump;

wherein said fifth clock signal switches high at a ninth time, said sixth clock signal switches low at a tenth time after the ninth time, said seventh clock signal switches high at an eleventh time after the tenth time, said eighth clock signal switches low at a twelfth time after the eleventh time, said eighth clock signal switches high at a thirteenth time after the twelfth time, said seventh clock signal switches low at a fourteenth time after the thirteenth time, said sixth clock signal switches high at a fifteenth time after the fourteenth time, and said fifth clock signal switches low at a sixteenth time after the fifteenth time.

17. A method of providing charge comprising the steps of:

applying a first plurality of clock signals to a first plurality of serially coupled charge pumps using a first logic high level;

applying a second plurality of clock signals to a second plurality of serially coupled charge pumps using a second logic high level, wherein said first plurality of charge pumps are clocked only by said first plurality of clock signals and said second plurality of charge pumps are clocked only by said second plurality of clock signals, said second logic high level is greater than said first logic high level, and an input of a one of the second plurality of serially coupled charge pumps is coupled to an output of a one of the first plurality of serially coupled charge pumps.

18. The method of claim 17, including clamping a respective output of each of the second plurality of serially coupled charge pumps with a p-n junction diode coupled between said respective output of the charge pump and a circuit ground.

* * * * *